United States Patent [19]

Hayashi

[11] Patent Number: 5,614,318

[45] Date of Patent: Mar. 25, 1997

[54] ANTI-STATIC ANCHOR COATING AGENT AND LAMINATED COMPOSITE FILM

[75] Inventor: Kanji Hayashi, Tokyo, Japan

[73] Assignee: Altech Company Limited, Tokyo, Japan

[21] Appl. No.: 539,355

[22] Filed: Oct. 5, 1995

[30] Foreign Application Priority Data

Oct. 31, 1994 [JP] Japan .................................. 6-267119

[51] Int. Cl.$^6$ ............................. B32B 7/12; B32B 7/10; B32B 27/00
[52] U.S. Cl. ..................... 428/353; 428/922; 428/343; 428/355 CN
[58] Field of Search .................................. 428/922, 353, 428/354, 355, 343

[56] References Cited

U.S. PATENT DOCUMENTS

| | | | |
|---|---|---|---|
| 4,438,176 | 3/1984 | Steiner et al. | 428/922 X |
| 5,182,169 | 1/1993 | Fukuda et al. | 428/922 X |
| 5,424,120 | 6/1995 | Culbertson | 428/353 X |

Primary Examiner—Daniel Zirker
Attorney, Agent, or Firm—McGlew & Tuttle

[57] ABSTRACT

The present invention is a bonding anchor coating agent and a laminated film having an anchor coating layer which provides a high anti-static performance on a film surface without having to mix the anti-static agent into the basic material of the film. The bonding anchor coating agent contains polyethylene imine and a bridge formation polymer having the ability to prevent electrostatic induction. The laminated film contains the anchor coating agent in the basic material of the film.

4 Claims, No Drawings

ANTI-STATIC ANCHOR COATING AGENT AND LAMINATED COMPOSITE FILM

FIELD OF THE INVENTION

The present invention relates to a laminated film for suppressing electrostatic charges on the outside surface of laminated plastic film and having the ability to prevent electrostatic charges in the vicinity of the film surface. This invention provides an effective material which can be utilized in many fields, such as packaging film, transferring film for building materials, and film for information recording materials where electrostatic charges pose a problem.

BACKGROUND OF THE INVENTION

All anchor coating agent is a material essential for the lamination processing of film. It is the means by which bonding strength is increased during the lamination of film, however, the anti-static agent must be mixed with the consisting plastic film prior to anti-static treatment of the laminated film. The anti-static agent mixed into the plastic film bleeds into the film surface over time, thereby preventing electrostatic charges on the plastic film surface. However, with regard to the bleeding of the anti-static agent onto the film surface, there are problems such as the deterioration of bonding strength after lamination, depending on the type of raw material used in the film; printing difficulty due to the faulty adhesion of printing ink; and the adhesion of contaminants from the packaging material to the packaged contents.

SUMMARY AND OBJECTS OF THE INVENTION

An object of the present invention is to develop a bonding anchor coating agent that gives a high anti-static performance on the film surface and a laminated film having the anchor coating layer without having to mix the anti-static agent into the basic film material and without the bleeding of anti-static agent.

The present invention solves these problems by using a bonding anchor agent comprising a particular bridge formation reactive polymer.

The present invention preferably comprises the following items (1) to (4):

(1) a bonding anchor coating agent containing polyethylene imine and a bridge formation reactive polymer having the ability to prevent electrostatic induction;

(2) a bridge formation reactive polymer comprising: (i) a copolymer macromolecule of vinyl monomer and acrylic acid ester monomer having a carboxylic group and Class quaternary ammonium base on the side chain, (ii) a polyglycidyl ether of a divalent or tetravalent aliphatic alcohol. The polyethylene imine should have an average molecular weight of 200 to 70,000;

(3) laminated film having the anchor coating layer to prevent electrostatic induction comprising the anchor coating agent described in item 1 on the plastic film basic material;

(4) laminated film with the ability to prevent electrostatic induction comprising:
(i) a layer of plastic film basic material, (ii) a layer of anchor coated material comprised of the anchor coating agent described in item 1, and (iii) the bonding agent layer and additional layers of plastic film.

The anchor coating agent enhances the bonding strength between the basic material film and the bonding agent; conspicuously increases the hot water resistance, water separation resistance and solvent resistance; and gives an excellent anti-static effect on the outer surface of the basic material of the film by its ability to prevent electrostatic induction.

These effects come from the bonding characteristics, water resistance, especially the hot water resistance, and solvent resistance of the bridge formation macromolecule due to the bridge formation reaction between the carboxylic group of the copolymer side chain and the mixed component of polyglycidyl ether and polyethylene imine described in item (2). Furthermore, the Class quaternary ammonium base of the copolymer side chain confers the ability to prevent electrostatic induction. The prompt induction, polarization relaxing (depolarization) behavior of the anchor coating layer attenuates the interfacial and surface electric charge of plastic film in contact with the anchor coating layer by its electrification and induction effect and has a charge preventive effect on the film surface.

The bridge formation copolymer of this invention can be obtained by co-polymerizing the monomers having each of said functional groups. The monomer having the —COOH group at its end may be comprised of chemicals such as acrylic acid (including the metha), acroyloxy ethyl succinic acid, phthalic acid, etc. The monomer having the quaternary ammonium base may be comprised of a quaternary substance (including the anion of a halide, sulfate, sulfonate, alkyl sulfonate, etc.) against the ion of di-methyl amine ethyl acrylate (including the metha). Beside these, the polymerized monomer may be comprised of vinyl derivatives, such as alkyl acrylate (including the metha), styrene, vinyl acetate and olefin.

Epoxy derivatives such as the polyglycidyl ether of a divalent or tetravalent aliphatic alcohol, for example, the glycerine di-glycidyl ether; polyethylene glycol glycidyl ether; polypropylene glycol glycidyl ether of a bifunctional monomer; the tri-methylol propane tri-glycidyl ether of a tri-functional monomer; and the tetra-glycidyl ether, such as the penta erythritol, neo-pentyl, etc., of a tetra-functional monomer may be used as the bridge formation hardening agent in this invention.

Furthermore, the polyethylene imine to be mixed with the epoxy derivative should have an average molecular weight from 200 to 70,000. Preferably, the linear polyethylene imine is used, but it may be partially branched.

The composition ratio of each monomer of the bridge formation copolymer can vary widely in the anchor coating agent. Among them, the monomer having the —COOH group at its end shall preferably be 2 to 13 mol % of all the monomers of the applicable copolymer, and the monomer having the quaternary ammonium group shall preferably be 10 to 40 mol % of all of the monomers. The copolymer is structured with the other monomers to be 53 to 88 mol %. The mixing ratio of polyglycidyl ether of the bridge formation hardening agent and polyethylene imine should be in the range of polyglycidyl ether/polyethylene imine=99/1 to 75/25 in the solid weight ratio, but should preferably be 95/5 to 90/10. In addition, the compounding ratio between the mixed compound and the copolymer should be in the range of copolymer/mixed compound 90/10 to 60/40 in the solid weight ratio, but preferably should be 85/15 to 70/30. A solvent can be used to adjust the mixing property, reaction property and viscosity of the constituents of the anchor coating agent. For example, water, alcohol, or the mixture of these liquids can be used, but is not limited to them.

The anchor coating agent of this invention can be applied to any of the resin film basic materials, for example, chemicals such as polyester (PET) oriented and non-oriented polyethylene phthalate, low density polyethylene (LDPE), linear low density polyethylene (LLDPE), polypropylene (OPP, CPP), poly vinylidene chloride (PVDC), poly vinyl acetate (PVAc), poly vinyl alcohol (PVA). In addition, this coating agent can also be applied to metal deposition composite film, colored film, printed film, etc.

After the anchor coating agent, which has been prepared and compounded as described above, is coated on the basic material of the film, it is laminated and bonded with the other basic materials of the film using the bonding agent as a dry laminate. The bonding separation strength of composite film which has been extrusion-coated by the LDPE shows a performance equal to the conventional type anchor coating agent, and the anti-static performance, which is the special feature of the anchor coating agent of this invention, shows an outstandingly high performance although the film surface has a high surface resistance value peculiar to the film basic material. This anti-static performance prevents any separation, friction and induction charges and, moreover, does not cause a contact friction charge against another plastic film coming into contact with this composite film. Therefore, this invention presents a useful material that can solve these problems without using charge preventive agents as the charge preventive measure as in conventional laminated film.

Laminated film using the anchor coating agent of this invention can be utilized for a variety of applications:

1) Packaging material field:

The packaging materials of foodstuffs and chemicals is considered problematic, especially where contamination occurs by the adhesion of surface active charge preventive agents to the contents.

2) Printing related field:

Prevention of electrostatic problems with printing ink during gravure printing and off-set printing.

3) Information recording material field:

Charge prevention on image receiving paper for transfer printing.

4) Building material field:

The plastic film can be applied to walls, especially thermal transfer printing film, or be applied to vinyl tiles.

5) Adhesive agent separation paper:

Application to the silicone mold used in separating paper.

6) Application to label materials and so forth.

The various features of novelty which characterize the invention are pointed out with particularity in the claims annexed to and forming a part of this disclosure. For a better understanding of the invention, its operating advantages and specific objects attained by its uses, reference is made to the accompanying descriptive matter in which preferred embodiments of the invention are illustrated.

DESCRIPTION OF THE PREFERRED EMBODIMENTS

In the following examples, the manufacturing method of the anchor coating agent of this invention and the embodiments of laminated film using said agent are shown.

Embodiment 1 (Anchor coating agent 1):

The monomers of MMA/AA/DMAQ where:

MMA=Methyl methacrylate

AA=Acrylic acid

DMAQ=Di-methyl amino ethyl methacrylate 4-class chloride were co-polymerized in the ratio of 67/3/30 by weight inside a mixed solution of isopropanol/water (mixing ratio of 2/1). A transparent solution of solid matter with a concentration of 30%, and solution viscosity of 1,100 mPa was obtained, Furthermore, 20 wt % of di-ethylene glycol diglycidyl ether and 3 wt % of polyethylene imine [average molecular weight 1200; Epomine SP-012 (registered trade name) manufactured by Nippon Shokubai] were added and mixed to the solution of solid matter as the bridge formation hardening agent, and the concentration (10%) of the solution of solid matter was adjusted with isopropanol. This shall be regarded as anchor coating agent 1 (AC1).

Embodiment 2 (Anchor coating agent 2):

The monomers of MMA/EA/AA/DMAQ (EA=Ethyl acrylate) were co-polymerized at the percentage of 60/5/5/30 by weight inside a mixed solution of isopropanol/water (mixing ratio of 2/1), and a transparent solution of solid matter at 29% and solution viscosity of 890 mPa was obtained. Furthermore, 7 wt % of di-ethylene glycol diglycidyl ether, 13 wt % of tri-methylole propa tri-glycidyl ether and 2 wt % of polyethylene imine [average molecular weight=70,000; Epomine P-1000 (registered trade name) manufactured by Nippon Shokubai] were added and mixed into this solution of solid matter as the hardening agent. The concentration of the solution of solid matter (10%) was adjusted with isopropanol. This shall be regarded as the anchor coating agent 2 (AC2).

Embodiment 3 (Laminated film 1: PET/AC/bonding agent/ CPP):

The AC1 was coated to a dry thickness of about 0.2 micron as the anchor coating agent on the polyethylene terephthalate (PET) film and dried for 10 seconds at 90° C. This adjusted PET film liquid coated face and 30 micron non-extended polypropylene (PP) film (CPP) were bonded and laminated to the bonding agent to a dry thickness of 3 micron (laminating temperature at 60° C., aging conditions: temperature at 38° C. for 48 hours) using the bonding agent (DIC-DRYLX-43+KM-75) for urethane system dry lamination.

Embodiment 4 (Laminated film 2: ONy/AC/bonding agent/ CPP):

After the AC1 was coated and dried to 15 micron oriented nylon (ONy) under the same conditions as Embodiment 3, it was bonded and laminated with 30 micron CPP film using the bonding agent of Embodiment 3. The bonding and laminating conditions are identical to Embodiment 3.

Embodiment 5 (Laminated film 3: OPP/AC/bonding agent/ CPP):

After the AC2 was coated and dried to 20 micron oriented PP (OPP) film under the same conditions as Embodiment 3, it was bonded and laminated with 30 micron CPP film using the bonding agent of Embodiment 3. The bonding and laminating conditions are identical to Embodiment 3.

Embodiment 6 (Laminated film 4: PET/AC/bonding agent/ OPP):

After the AC2 was coated and dried to 12 micron PET film under the same conditions as Embodiment 3, it was bonded and laminated with 20 micron OPP film using the bonding agent of Embodiment 3. The bonding and laminating conditions are identical to Embodiment 3.

Embodiment 7 (Laminated film 5: PET/AC/LDPE/LLDPE):

After the AC1 was coated and dried to 12 micron PET film under the same conditions as Embodiment 3, the PET film was laminated and bonded with 40 micron corona treated LLDPE film at the LDPE (resin temperature of around 300° C.) using extrusion coating. The aging conditions are identical to Embodiment 3. The layer thickness of LDPE is about 15 microns.

The laminated film which was bonded and laminated using a conventional commercially available anchor coating agent [Epomine (registered trade name), manufactured by Nippon Shokubai] was used in the comparison examples and its performance was compared with that of the laminated films of said embodiments:

Comparison example 1 (PET/ac/bonding agent/CPP)
Comparison example 2 (ONy/ac/bonding agent/CPP)
Comparison example 3 (OPP/ac/bonding agent/CPP)
Comparison example 4 (PET/ac/bonding agent/CPP)
Comparison example 5 (PET/ac/LDPE/LLDPE)

Each structural film, bonding agent and bonding conditions used in the comparison examples 1 to 5 are identical to Embodiments 3 to 7 except for the commercially available anchor coating agent.

The laminated films 1 to 5 of Embodiments 3 to 7 that were obtained and the laminated films in comparison examples 1 to 5 were evaluated in the following categories, and the results are shown in Table 1.

While specific embodiments of the invention have been shown and described in detail to illustrate the application of the principles of the invention, it will be understood that the invention may be embodied otherwise without departing from such principles.

What is claimed is:

1. An anti-static laminated film having an anchor coating layer comprising a plastic film base material and a bonding anchor coating agent including polyethylene imine and a bridge formation reactive macromolecule having the ability to prevent electrostatic induction.

2. An anti-static laminated film according to claim 1, wherein said bridge formation reactive macromolecule comprises
   (1) a copolymer consisting of a vinyl monomer and an acryl ester monomer having a carboxyl group and a Class quaternary ammonium base on the chain side;
   (2) a polyglycidyl ether of a divalent or tetravalent aliphatic alcohol and;
   (3) a polyethylene imine having an average molecular weight from 200 to 70,000.

TABLE 1

| | Laminate structure | Bonding strength (g) | Heat seal strength (kg) | Surface friction zone voltage (kV) |
|---|---|---|---|---|
| Embodiment 3 | PET12μ/AC1/bonding agent/CPP30μ | 540 | 5.0 | 0 |
| Embodiment 4 | ONy15μ/AC1/bonding agent/CPP30μ | 480 | 5.0 | 0 |
| Embodiment 5 | OPP20μ/AC2/bonding agent/CPP30μ | 370 | 4.5 | 0 |
| Embodiment 6 | PET12μ/AC2/bonding agent/OPP20μ | 450 | 5.0 | 0 |
| Embodiment 7 | PET12μ/AC1/LDPE15μ/LLDPE40μ | 500 | 5.0 | 0 |
| Comparison Example 1 | PET12μ/ac/bonding agent/CPP30μ | 550 | 5.0 | 3.5 |
| Comparison Example 2 | ONy15μ/ac/bonding agent/CPP30μ | 500 | 5.0 | 2.2 |
| Comparison Example 3 | OPP20μ/ac/bonding agent/OPP30μ | 400 | 5.0 | 3.2 |
| Comparison Example 4 | PET 12μ/ac/bonding agent/CPP30μ | 450 | 5.0 | 3.2 |
| Comparison Example 5 | PET 12μ/ac/LDPE15μ/LLDPE40μ | 500 | 5.0 | 3.2 |

Test conditions:

Comparison of bonding strength: T type separation 15 mm width, 300 mm/Min.

Comparison of heat seal strength: T type separation 15 mm width, 00 mm/Min. Heat seal conditions: 180° C. for 1 second, 2 kg/cm 2.

Comparison of surface friction zone voltage: The surface friction zone voltage after the friction of 30 reciprocating frictions using the tissue paper (temperature at 27° C. and humidity at 48% RH).

As described above, the present invention gives a high anti-static performance on film surfaces while maintaining a high bonding strength and heat seal strength without having to mix the anti-static agent into the basic material of the film.

3. An anti-static laminated composite film according to claim 1, further comprising a bonding agent layer.

4. An anti-static laminated composite film according to claim 3, wherein said bridge formation reactive macromolecule includes:
   (1) a copolymer of a vinyl monomer and acryl ester monomer having a carboxyl group and a Class quaternary ammonium base on the chain side;
   (2) a polyglycidyl ether of a divalent or tetravalent aliphatic alcohol and;
   (3) a polyethylene imine having an average molecular weight from 200 to 70,000.

* * * * *